US011550835B2

(12) United States Patent
Doornenbal et al.

(10) Patent No.: US 11,550,835 B2
(45) Date of Patent: Jan. 10, 2023

(54) SYSTEMS AND METHODS FOR AUTOMATICALLY GENERATING CONTENT SUMMARIES FOR TOPICS (71) Applicant: Elsevier, Inc., New York, NY (US)

(72) Inventors: Marius Doornenbal, Woerden (NL); Srinivasa Satya Sameer Kumar Chivukula, Hyderabad (IN); Judson Dunham, Bexley, OH (US); Rick Misra, San Marcos, CA (US); Michelle Gregory, Wassenaar (NL)

(73) Assignee: ELSEVIER, INC., New York, NY (US)

( * ) Notice: Subject to any disclaimer, the term of this patent is extended or adjusted under 35 U.S.C. 154(b) by 688 days.

(21) Appl. No.: 16/009,924

(22) Filed: Jun. 15, 2018

(65) Prior Publication Data

US 2018/0365323 A1 Dec. 20, 2018

Related U.S. Application Data (60) Provisional application No. 62/520,991, filed on Jun. 16, 2017.

(51) Int. Cl.
G06F 16/34 (2019.01)
G06F 16/93 (2019.01)
(Continued)

(52) U.S. Cl.
CPC .......... G06F 16/345 (2019.01); G06F 16/334 (2019.01); G06F 16/335 (2019.01); G06F 16/93 (2019.01); G06F 16/9535 (2019.01)

(58) Field of Classification Search
USPC ........................................................ 707/730
See application file for complete search history.

(56) References Cited

U.S. PATENT DOCUMENTS 7,689,536 B1   3/2010   Weissman et al.
7,912,849 B2   3/2011   Ohm et al.
(Continued)

OTHER PUBLICATIONS

Aliaksei Severyn; Learning to Rank Short Text Pairs with Convolution Deep Deural Networks; ACM; 2015;pp. 373-382 (Year: 2015).*

(Continued)

Primary Examiner — Amresh Singh
Assistant Examiner — Jermaine A Mincey
(74) Attorney, Agent, or Firm — Dinsmore & Shohl LLP (57) ABSTRACT A method of automatically generating content summaries for topics includes receiving a taxonomy for a concept and a text corpus. The method further includes generating an annotated dataset having term annotations corresponding to the concept from the text corpus based on the taxonomy, parsing the annotated dataset into a custom generated document object having a structured layout, determining features for the term annotations, and extracting snippets from the custom generated document object, where each of the snippets corresponds to a section of the custom generated document object. The method further includes scoring the snippets based on the features such that each of the snippets corresponds to a score, filtering one or more snippets from the snippets when one or more snippet filtering conditions is met, ranking the snippets into an ordered list for the concept based on the score, and providing, to a user computing device, the ordered list.

20 Claims, 5 Drawing Sheets (51) Int. Cl.
  *G06F 16/33*     (2019.01)
  *G06F 16/335*    (2019.01)
  *G06F 16/9535*   (2019.01)

(56) References Cited

U.S. PATENT DOCUMENTS

| | | |
|---|---|---|
| 8,706,730 B2 | 4/2014 | Joshi et al. |
| 8,805,843 B2 | 8/2014 | Chen et al. |
| 8,954,425 B2 | 2/2015 | Xiao et al. |
| 9,177,051 B2 | 11/2015 | Pollara |
| 9,367,608 B1 * | 6/2016 | Zhang .................... G06F 16/35 |
| 9,678,949 B2 | 6/2017 | Monk, II et al. |
| 9,721,017 B2 | 8/2017 | Denninghoff |
| 2011/0093257 A1 | 4/2011 | Shpigel et al. |
| 2011/0184960 A1 | 7/2011 | Delpha et al. |
| 2012/0246155 A1 | 9/2012 | Vadlamani et al. |
| 2014/0095478 A1 | 4/2014 | Lamba et al. |
| 2014/0317074 A1 | 10/2014 | Song et al. |
| 2016/0062969 A1 * | 3/2016 | Mengle ................ G06F 40/169 |
| | | 704/9 |
| 2017/0060999 A1 * | 3/2017 | Son ....................... G06F 16/353 |
| 2018/0052816 A1 * | 2/2018 | Ma .......................... G06F 40/30 |
| 2018/0268063 A1 * | 9/2018 | Pawar ................ G06F 16/9024 |

OTHER PUBLICATIONS

International Search Report and Written Opinion of the International Searching Authority, dated Sep. 12, 2018, PCT.

Yael Garten, Adrien Coulet, Russ B. Altman, "Recent progress in automatically extracting information from the pharmacogenomic literature", Pharmacogenomics, Oct. 11, 2010 (10): 1467-1489.

* cited by examiner

SYSTEMS AND METHODS FOR AUTOMATICALLY GENERATING CONTENT SUMMARIES FOR TOPICS

CROSS REFERENCE TO RELATED APPLICATIONS

This application claims the benefit of U.S. Provisional Application No. 62/520,991, filed Jun. 16, 2017, the contents of which are hereby incorporated by reference in its entirety.

TECHNICAL FIELD

The present specification generally relates to systems and methods for automatically generating content summaries for topics and, more specifically, systems and methods for extracting snippets and definitions corresponding to concepts within a text corpus for the content summaries.

BACKGROUND

As the amount and diversity of electronic content increases, researchers, authors, professors, students, and the like face an increasing challenge with searching, parsing, and identifying quality primary references related to their respective areas of interest. Currently, many utilize publicly available searchable content such as Wikipedia to obtain further information for a concept. However, these sources do not satisfy the need for authoritative information for concepts. That is, many researchers, authors, professors, attorneys, students, and the like seek access to further information within their customary workflows such as further information from books, journal articles, case law, and/or other reference databases. Additionally, not only is access to these more primary and authoritative types of literature desired, but also are summaries of content which may be used to further determine whether a particular source is pertinent to their particular concept or area of interest.

SUMMARY

In one embodiment, a method of automatically generating content summaries for topics includes receiving, at a computing device, a taxonomy for a concept; and receiving, at the computing device, an unstructured text corpus. The method further includes generating an annotated dataset from the unstructured text corpus based on the taxonomy, where the annotated dataset includes one or more term annotations corresponding to the concept, parsing the annotated dataset into a custom generated document object having a structured layout, determining one or more features for each of the one or more term annotations, and extracting a plurality of snippets for the concept from the custom generated document object, where each of the plurality of snippets corresponds to a section of the custom generated document object. The method further includes scoring each of the plurality of snippets based on the one or more features such that each of the plurality of snippets for the concept corresponds to a comprehensive score, where the one or more features include at least one of the following: a relative offset of a first occurrence of the concept in the section, a relative offset of a last occurrence of the concept in the section, a total number of occurrences of the concept in the section, a count of tokens in the section, or a similarity rank between the concept and a title of the section. The method further includes filtering out one or more snippets from the plurality of snippets when one or more snippet filtering conditions is met, ranking the plurality of snippets into an ordered list of snippets for the concept based on the comprehensive score, where a first snippet in the ordered list of snippets is a top ranked snippet and is more relevant to the concept than a second snippet in the ordered list of snippets, and providing, to a user computing device, the ordered list of snippets.

In another embodiment, a method of automatically generating content summaries for topics includes receiving, at a computing device, a taxonomy for a concept and receiving, at the computing device, an unstructured text corpus. The method further includes generating an annotated dataset from the unstructured text corpus based on the taxonomy, where the annotated dataset includes one or more term annotations corresponding to the concept, parsing the annotated dataset into a custom generated document object having a structured layout, wherein the custom generated document object defines one or more sentences within the annotated dataset, identifying one or more potential definition sentences for the concept and determining one or more features for each of the one or more potential definition sentences. The method further includes scoring the one or more potential definition sentences based on the one or more features such that each of the one or more potential definition sentences includes a comprehensive score, wherein the one or more features include at least one of the following: a title weight, a verb weight, a sentence weight, or a similarity weight, where: the title weight is associated with a similarity of a title of a section including one of the one or more potential definition sentences to the concept, the verb weight is associated with a presence of a verb that indicates a definition, the sentence weight is associated with a position of the one or more potential definition sentences within a paragraph of the section, and the similarity weight is associated with a similarity score defined by comparing one of the one or more potential definition sentences to a standard definition of the concept. The method further includes filtering out one or more of the one or more potential definition sentences when one or more definition filter conditions is met, ranking the one or more potential definition sentences into an ordered list of definitions for the concept based on the comprehensive score, where a first definition in the ordered list of definitions is more relevant to the concept than a second definition in the ordered list of definitions, and providing, to a user computing device, the ordered list of definitions.

In yet another embodiment, a system for automatically generating content summaries for topics includes a processor and a non-transitory, processor-readable memory coupled to the processor. The non-transitory, processor-readable memory includes a machine readable instruction set stored thereon that, when executed by the processor, causes the processor to: receive a taxonomy for a concept, receive an unstructured text corpus, where the unstructured text corpus includes text from one or more reference sources and generate an annotated dataset from the unstructured text corpus based on the taxonomy, where the annotated dataset includes one or more term annotations corresponding to the concept. The processor further parses the annotated dataset into a custom generated document object having a structured layout, determines one or more features for each of the one or more term annotations, and extracts from the custom generated document object, a plurality of snippets for the concept, where each of the plurality of snippets corresponds to a section of the custom generated document object. The processor further scores each of the plurality of snippets based on the one or more features such that each of the plurality of snippets for the concept corresponds to a comprehensive score, where the one or more features include at least one of the following: a relative offset of a first occurrence of the concept in the section, a relative offset of a last occurrence of the concept in the section, a total number of occurrences of the concept in the section, a count of tokens in the section, or a similarity rank between the concept and a title of the section, filters out one or more snippets from the plurality of snippets when one or more snippet filtering conditions is met, ranks the plurality of snippets into an ordered list of snippets for the concept based on the comprehensive score, where the first snippet in the ordered list of snippets is a top ranked snippet and is more relevant to the concept than a second snippet in the ordered list of snippets, and stores the ordered list of snippets for the concept.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure relate to computer based systems and methods that scan full text literature, extract relevant and targeted pieces of textual information with respect to a particular concept from the text, and identify the most relevant pieces of textual information for the particular concept.

Embodiments of the present disclosure include systems and methods for consuming unstructured text. For example, the systems and methods consume full book chapters in the form of XML text. As will be described in more detail herein, the system generates annotated data as an output on the unstructured text. For example, the systems and methods may utilize one or more annotation algorithms that identify named entities in unstructured text (e.g., gazetteers or named entity recognizers). The annotated data contains metadata indicating various terms found in the text as well as term annotations that mark the start and end offsets of a concept within a section of the unstructured text. In some embodiments, another module (e.g., a Smart Content Module) receives as input the annotated data and a taxonomy of concepts, and parses the data to build a custom generated document object. The custom generated document object arranges the annotated data in a structural layout. While building the custom generated document object, raw text data is reordered into logical units for snippet and definition extraction. As used herein, a "snippet" refers to a portion of literature that discusses a concept. The snippet may include information regarding the concept so that a user may locate related discussions about the concept.

The snippets and definitions are scored, filtered, and ranked to identify the most relevant snippet and definition for a particular concept. For example, the scoring for snippets may be based on the first occurrence of a concept, a number of occurrences of the concept in a specific section, and the size of the specific section. Filtering may be performed to ensure that the snippets are preferably located at the beginning of a section as well as to confirm that the amount of text in a snippet is appropriate (i.e., not too small or too large). The ranking may then be performed to identify the most relevant snippets from a particular concept. Some factors for ranking may include the similarity between the section and/or chapter title and the particular concept.

For example, for domains of science, the system described herein, identifies the mention of specific concepts in the text, and aggregates data with a specific and unique set of parameters. The system also has the capability to qualify the text containing the mentioned concepts. That is, qualifying the nature of the mention of the concept, for instance that the sentence containing the concept is a definition of the concept. Additionally, other types of information that may be identified include information regarding aspects of the concepts, such as background, methodology, and/or experimental results.

Furthermore, a user computing device that displays pages of material for reading may include links to the topic-related information as background reading in the sidebar, in-line with the content itself, or even as a separate page which may be navigated to by selecting the concept within the displayed material. It should be understood that this provides the user or reader of information with accessible summaries of relevant background or further information around a specific concept of interest.

It should be understood through the description of the systems and methods herein that the generation of content summaries, in particular, the extraction of ordered lists of snippets and ordered lists of definitions for one or more particular concepts from an unstructured text corpus improves the quality of search results for a particular concept. The quality of the search results (i.e., the snippets and definitions) is improved because scoring, filtering, and ranking steps applying various rules and filtering conditions are utilized. That is, the scoring, filtering, and ranking steps reduce the amount of material to a relevant set of material from which snippets and definitions may be extracted. Furthermore, snippets and definitions are prioritized (i.e., ranked) against other snippets and definitions, respectively. Moreover, the amount of computer resources required to carry out a search are reduced because less processing power and less memory is necessary to search an ordered lists of snippets and/or an ordered lists of definitions to generate a content summary in response to a query of a particular concept relative to a conventional search that searches an entire corpus of documents. Additionally, as new reference sources are published, the systems and methods described herein may generate a plurality of snippets and potential definitions from the new references sources and update the ordered lists of snippets and ordered lists of definitions, respectively, to maintain relevant and current information.

Various embodiments for automatically generating content summaries having snippets and/or definitions for a concept are now described herein below.

Figure 1:
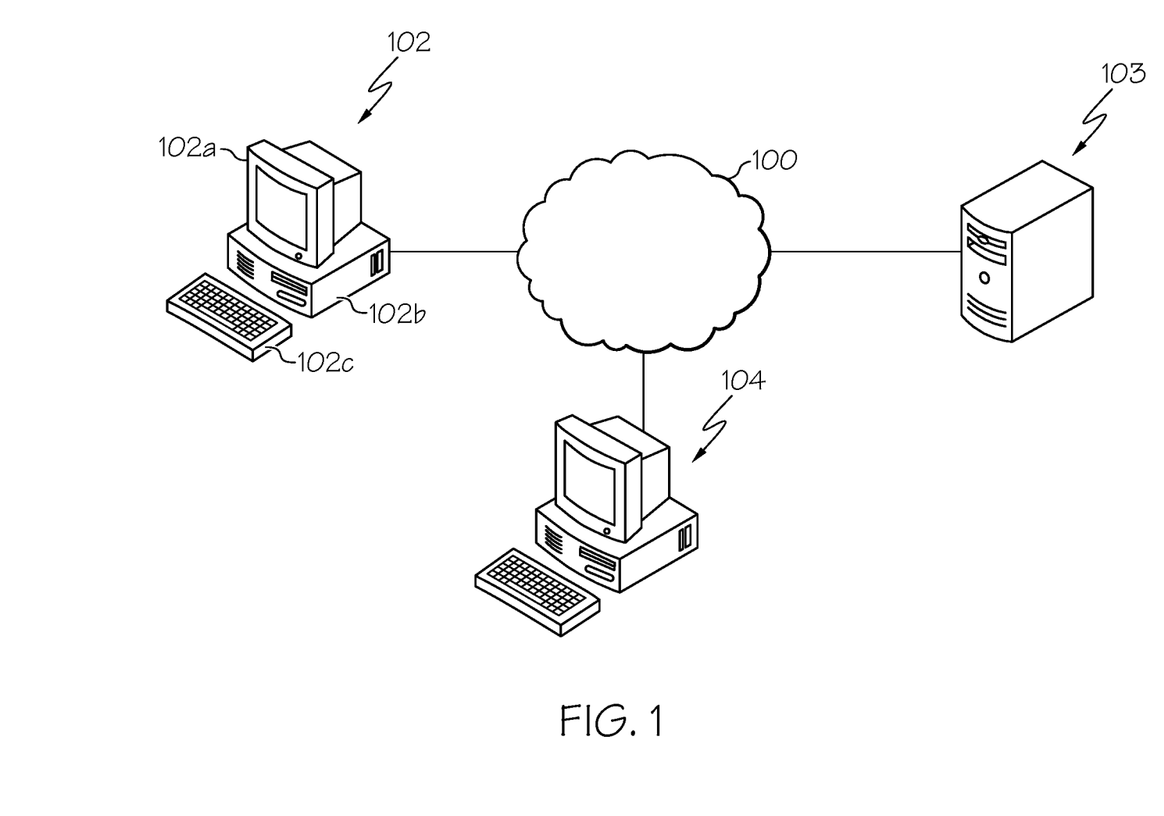
FIG. 1 schematically depicts an example computing network for automatically generating content summaries for topics, according to one or more embodiments shown and described herein.

Referring now to the drawings, FIG. 1 depicts an exemplary network 100, illustrating components for a system that automatically generates content summaries for concepts, according to one or more embodiments shown and described herein. As illustrated in FIG. 1, a network 100 may include a wide area network, such as the internet, a local area network (LAN), a mobile communications network, a public service telephone network (PSTN) and/or other network and may be configured to electronically connect a user computing device 102, a computing device 103 for generating content summaries, and an administrator computing device 104.

The user computing device 102 may include a display 102a, a processing unit 102b and an input device 102c, each of which may be communicatively coupled to together and/or to the network 100. The user computing device 102 may be used to initiate an electronic search for one or more concepts. More specifically, to perform an electronic search, the user computing device 102 may send a request or query for more information regarding a concept (such as a hypertext transfer protocol (HTTP) request) to the computing device 103 (or other computer device). The computing device 103 in response may provide a content summary for the concept and present on a display 102a of the user computing device 102 a dynamically generated interface, for example a webpage, with the results of the query.

Additionally, included in FIG. 1 is the administrator computing device 104. In the event that the computing device 103 for generating content summaries requires oversight, updating, or correction, the administrator computing device 104 may be configured to provide the desired oversight, updating, and/or correction.

It should be understood that while the user computing device 102 and the administrator computing device 104 are depicted as personal computers and the computing device 103 for generating content summaries is depicted as a server, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the user computing device 102, the computing device 103 for generating content summaries, and administrator computing device 104 may represent a plurality of computers, servers, databases, and the like.

Figure 2:
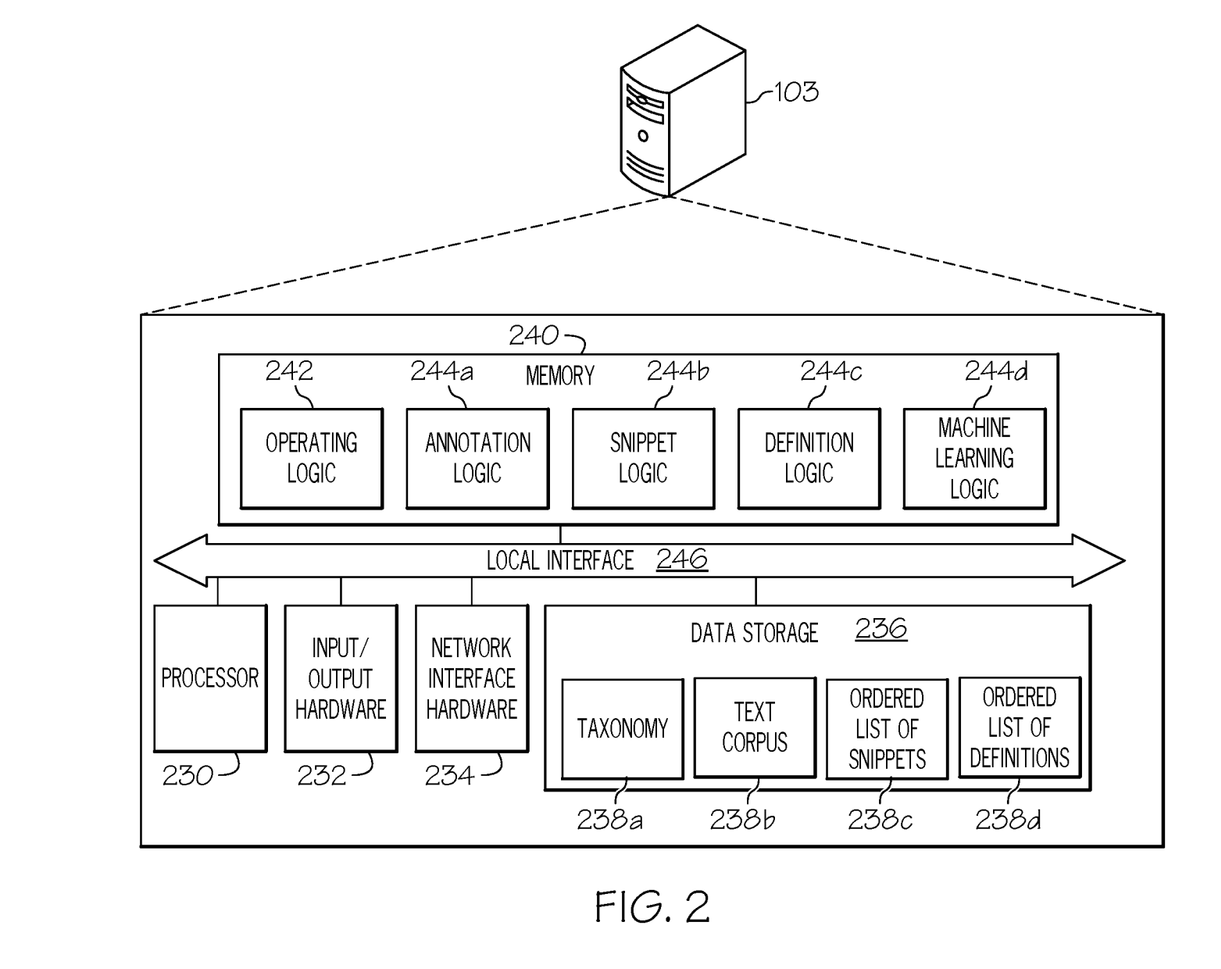
FIG. 2 schematically depicts an example computing device for automatically generating content summaries for topics, according to one or more embodiments shown and described herein.

FIG. 2 depicts the computing device 103 for generating content summaries, from FIG. 1, while further illustrating a system that extracts, scores, filters, ranks, snippets and definitions for content summaries from an unstructured text corpus for one or more concepts. The computing device 103 for generating content summaries may utilize hardware, software, and/or firmware, according to embodiments shown and described herein. While in some embodiments, the computing device 103 may be configured as a general-purpose computer with the requisite hardware, software, and/or firmware, in some embodiments, the computing device 103 may be configured as a special purpose computer designed specifically for performing the functionality described herein.

As also illustrated in FIG. 2, the computing device 103 may include a processor 230, input/output hardware 232, network interface hardware 234, a data storage component 236, which stores a taxonomy 238a containing a list of concepts, a text corpus 238b, ordered lists of snippets 238c, and ordered lists of definitions 238d, and a memory component 240. The memory component 240 may be machine readable memory (which may also be referred to as a non-transitory processor readable memory). The memory component 240 may be configured as volatile and/or non-volatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242, annotation logic 244a, snippet logic 244b, definition logic 244c, and machine learning logic 244d (each of which may be embodied as a computer program, firmware, or hardware, as an example). A local interface 246 is also included in FIG. 2 and may be implemented as a bus or other interface to facilitate communication among the components of the computing device 103.

The processor 230 may include any processing component(s) configured to receive and execute programming instructions (such as from the data storage component 236 and/or the memory component 240). The instructions may be in the form of a machine readable instruction set stored in the data storage component 236 and/or the memory component 240. The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, Wi-Fi card, WiMax card, mobile communications hardware, and/or other hardware for communicating with other networks and/or devices.

It should be understood that the data storage component 236 may reside local to and/or remote from the computing device 103 and may be configured to store one or more pieces of data for access by the computing device 103 and/or other components. As illustrated in FIG. 2, the data storage component 236 stores a taxonomy 238a containing a list of concepts. For each concept within the taxonomy 238a, a preferred label and one or more of its variant forms (i.e., alternate labels) may be defined. A unique common concept ID may be assigned to both the preferred label and alternate labels of the concept. For example Table 1, below, depicts a preferred label (i.e., "prefLabel") and several alternate labels (i.e., "altLabel") for the concept "1,1,1-Trichloroethane"

| Concept ID | Type | Concept |
| --- | --- | --- |
| 200018451 | prefLabel | 1,1,1-Trichloroethane |
| 200018451 | altLabel | 1,1,1-TCA |
| 200018451 | altLabel | 1,1,1,-Trichloroethane |
| 200018451 | altLabel | CH3CCL3 |
| 200018451 | altLabel | Chlorothene |
| 200018451 | altLabel | Genklene |
| 200018451 | altLabel | Methyl chloroform |
| 200018451 | altLabel | Solvent 111 |

As depicted in Table 1, above, the concept "1,1,1-Trichloroethane" may be referred to, within the same document or various documents, in a variety of ways. The system and methods may consider each of these variants as referring to the same concept. That is, "1,1,1-Trichloroethane" may be considered a preferred label (i.e., a preferred name for the concept) while the other variants (e.g., "1,1,1-TCA," "1,1,1-Trichloroethane," "CH3CCL3," "Chlorothene," "Genklene," "Methyl chloroform," or "Solvent 111") may be used to express the same concept.

As used herein, the term "concept" may refer to either the preferred or an alternate form of the concept.

Similarly, the text corpus 238b may be stored in the data storage component 236. The text corpus 238b may be an unstructured text corpus 238b. A non-limiting example of the unstructured text corpus 238b may be full text literature as present in electronic document data repositories, such as books, book chapters, journal articles, legal documents, publication abstracts, project summaries, proposals, patents, or the like in XML or other formats. The data storage component 236 may also include ordered lists of snippets 238c and ordered lists of definitions 238d. As described in more detail herein, the ordered lists of snippets 238c and the ordered lists of definitions 238d may be the output results of the systems and methods for automatically generating content summaries. These may include lists of snippets and definitions for particular concepts in a most relevant to least relevant ordering such that when the system and methods described herein generate a dynamic webpage in response to a query of a concept for example, the ordered lists of snippets 238c and the ordered lists of definitions 238d may be accessed for information for the content summaries presented on the dynamic webpage, for example.

Included in the memory component 240 are the operating logic 242, the annotation logic 244a, the snippet logic 244b, the definition logic 244c, and the machine learning logic 244d. The operating logic 242 may include an operating system and/or other software for managing components of the computing device 103. The annotation logic 244a may be configured to facilitate the generation of annotated data from the text corpus 238b. The annotation logic 244a, for example, may implement one or more annotation algorithms that identify named entities in unstructured text, which consumes unstructured text as an input, applies a workflow that is configured for a specific domain of science, for example, and generates an output of annotated data. The annotated data may contain metadata about various terms that are found in the text corpus 238b (e.g., a book chapter). Additionally, the annotation logic, when executed generates, for example, concept annotations, term annotations, part-of-speech tags (POS tags), words, lemmas, tokens, sentences, sections, and/or the like from the unstructured text corpus 238b. As used herein, "concept annotations" refer to the concepts identified within the unstructured text corpus 238b. Similarly, "term annotations" provide the start and end offsets of the concept in a section, paragraph, or any other element in which they were annotated, regardless of whether the concept arises as a preferred label, alternate label, an acronym, or not. The annotation logic 244a may further annotate the terms with a POS tag. A POS tag identifies the part-of-speech (e.g., noun, noun-plural, verb, adjective, adverb, or the like) that corresponds to the use of the word within a sentence. The unstructured text corpus 238b may be further annotated to identify words, sentences, and sections. Additionally, lemmas, (i.e., the citation form or headword of the words within the unstructured text corpus 238b) may be annotated. Moreover, the unstructured text corpus 238b may be annotated with tokens, or in other words location markers, which may correspond to words, characters, spaces, n-grams (i.e., a predetermined number of characters), or the like.

Snippet logic 244b may also be stored within the memory component 240. Snippet logic 244b may be configured to extract, score, filter, and rank a plurality of snippets from the annotated data for generating a content summary, as described in more detail herein. Similarly, definition logic 244c may be configured to identify potential definition sentences and then score, filter and rank the potential definition sentences from the annotated data for generating the content summary, as described in more detail herein. Additionally, a machine learning logic 244d may be stored in the memory component 240 and configured to extract definitions from annotated data and/or unstructured text corpus 238b for a particular concept by implementing machine learned rules. For example, the machine learning logic 244d may include a convolutional neural network (CNN), random forest, long short-term memory (LSTM), a multilayer perceptron (MLP) feedforward artificial neural networks or the like. That is, machine learning logic 244d may receive as an input structured or unstructured text, depending on how the machine learning system has been trained. In response, the machine learning system may identify definitions and/or snippets for a concept with a probability score indicating the relevancy of the definition or snippet to candidate definitions and snippets.

It should also be understood that the components illustrated in FIG. 2 are merely exemplary and are not intended to limit the scope of this disclosure. More specifically, while the components in FIG. 2 are illustrated as residing within the computing device 103, this is merely an example. In some embodiments, one or more of the components may reside external to the computing device 103. Similarly, while FIG. 2 is directed to the computing device 103, other components such as the user computing device 102 and the administrator computing device 104 may include similar hardware, software, and/or firmware.

Embodiments for generating content summaries having snippets and definitions for a particular concept from an unstructured text corpus 238b will now be described.

Figure 3:
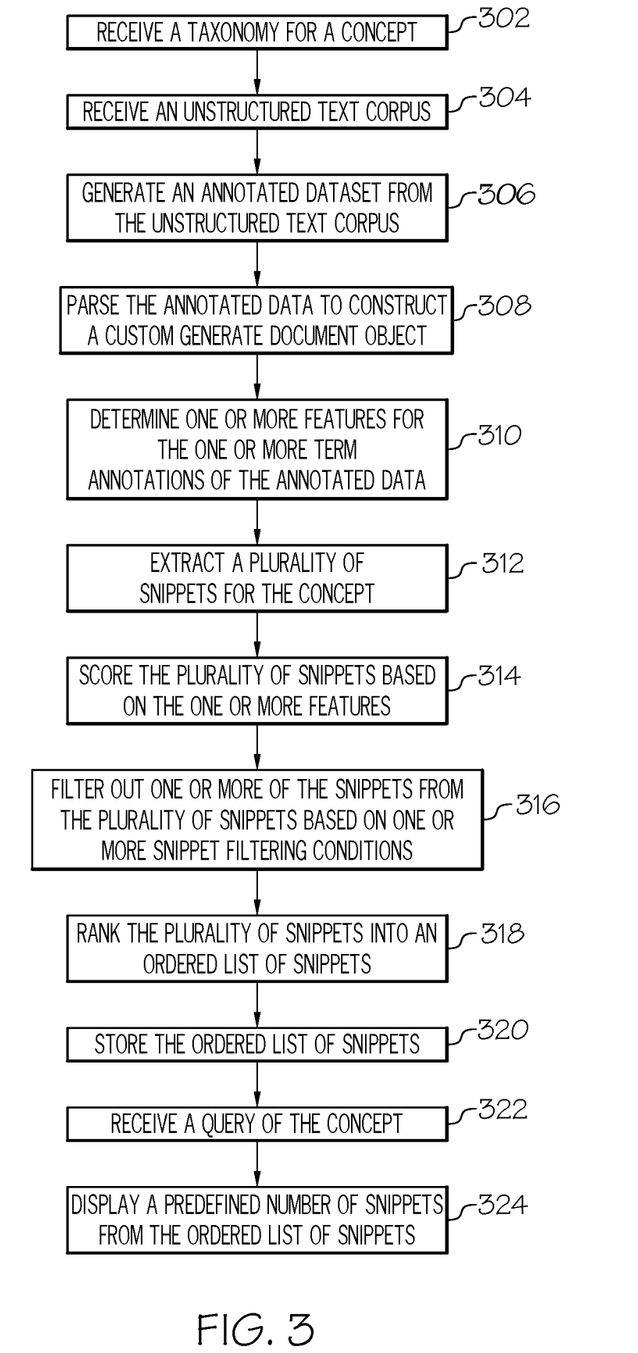
FIG. 3 depicts a flowchart for an example method of extracting snippets for a content summary of a topic, according to one or more embodiments shown and described herein.

Referring to FIG. 3, a flowchart for an example method of extracting snippets for a content summary of a topic, according to one or more embodiments described herein is depicted. In some embodiments, the extraction of snippets for content summaries of a concept may start with the unstructured text corpus. In other embodiments, a structured text corpus may be received and may further include annotated data from which the extraction, scoring, filtering, and ranking steps may be directly carried out. In the flowchart depicted in FIG. 3, the extraction of snippets includes the input of a taxonomy containing a list of concepts and the unstructured text corpus. At step 302, the computing device may receive or retrieve a taxonomy containing a list of concepts from a data storage component or memory component. In some embodiments, the taxonomy that is received or retrieved from the data storage component or memory component may be specific to the domain of the literature within the text corpus for which content summaries are to be generated. For example, a taxonomy having a list of concepts for a domain related to physics may be selected when the domain of literature relates to science and/or specifically to physics. However, in some embodiments, the domain of literature within the text corpus may be unknown, and therefore, a taxonomy or multiple taxonomies may be received or retrieved that relate to many domains (e.g., science, math, history, law, or the like). The system may determine the domain of the literature by identifying keywords within the unstructured text corpus, including for example, from titles, section headings, abstracts, or other parts of the reference sources making up the unstructured text corpus that indicate a particular domain. In some embodiments, literature (e.g., unstructured text corpus) may be pre-sorted into groups based on domains by independent systems and methods and one or more predetermined taxonomies may be associated with the literature.

Additionally, at step 304, the computing device may receive or retrieve the unstructured text corpus from a data storage component or memory component. As referenced above, the system may utilize execute annotation logic 244a, at step 306. The annotation logic, when executed, receives the unstructured text corpus and generates an annotated dataset. In some embodiments, the unstructured text corpus is mined for metadata about various identified terms, concepts, POS tags, words, lemmas, tokens, sentences, sections, paragraphs, or the like. In some embodiments, annotation of the unstructured text corpus is guided by the taxonomy containing a list of concepts. That is, in generating the annotated dataset each concept within the taxonomy is mined and annotated. The annotated concepts are referred to herein as term annotations. That is, the annotated dataset includes one or more term annotations corresponding to the concept. Term annotations provide the start and end offset of the concept within a section, paragraph, sentence, or any other element in which they were annotated, whether the concept appears as a preferred label, alternate label, acronym or not.

At step 308, the computing device parses the annotated dataset to construct a custom generated document object having a structured layout. The custom generated document object defines the annotated data in a structured layout. In some embodiments, the structured layout may include raw unstructured text data reordered into logical units for snippet and definition extraction. For example, the input unstructured text may be analyzed and transformed into a custom generated document object representing the (a) sequence of textual elements in logical order (i.e., reading order), (b) functional and conceptual roles of paragraphs or textual elements in relation to the entirety of the document (e.g., within the document and/or within the text corpus), for instance 'table', 'reference', 'title', 'section title', 'abstract', 'section text' and the like; and (c) hierarchical relations holding between textual elements in the document. Although other layouts may include the text from the raw unstructured text data, the custom generated document object provides portions of the text from the raw unstructured text data in logical units with corresponding metadata. The logical units and corresponding metadata allow the system to efficiently identify, locate, score, filter, rank, and extract portions of text (e.g., snippets and definitions) for a particular concept.

At step 310, the computing device determines one or more features for each of the term annotations. For every term annotation within a section a set of one or more features may be identified that indicate how relevant the section is for the concept and whether that snippet is considered a good snippet for the concept. In some embodiments, one or more features are determined using a notation referred to herein as a "bucket." A "bucket" defines a portion of a section where multiple buckets sequentially and generally equally span across a section. For example, an n number of buckets for a section are chosen. Each bucket is assumed to contain (100/x) % of the overall text in sequential order of that section. That is, if x=5, then the bucket 1 spans (100/5) % or the first 20% of text in the section. Then, bucket 2 spans the next 20° % of text and so on and so forth. Buckets are used as another measure to indicate the relevance of a location of feature within the section. Buckets may be used to normalize the relationship of the location of a concept found in a first section with that of the same concept found in a second section. For example, the first section (e.g., a journal article within the unstructured text corpus), may be 1 page in length and the second section (e.g., another journal article within the unstructured text corpus) may be 2 pages in length. By dividing each of the first and second sections into a respective n (e.g., x=5) number of buckets, the first bucket for each of the first and second sections refers to the first 20%° of text therein. In some embodiments, it is advantageous that a concept appear in an earlier portion of the section than a later portion since a more relevant section for a concept will begin discussing the concept early in a section rather than later on or near the end of a section. As such, when it is advantageous to have a snippet for a concept occur early in the section of text, using buckets provides a comparable relationship to the position of the concept within the first and second sections, when the first and second sections have different lengths. Conversely, such a comparison would not be possible if only the relative offset from the beginning of a section of text was used to identify the location of a concept within two or more sections having different overall lengths of text. In some embodiments, the bucket position of a concept and the relative offset of a concept within a section of text may be used to determine whether a snippet generated from the location of the particular concept is more relevant then another occurrence of the concept and subsequent snippet generated therefrom.

In some embodiments, the one or more features captured for the one or more term annotations may include a determination of the relative offset of the first occurrence of a concept in a section, the relative offset of the last occurrence of a concept in a section, the number of occurrences of a concept in the section, a count of the number of tokens in the section, the ID of the bucket in which the first occurrence of a concept arises, a distribution of the concept occurrence in a section, the similarity of the chapter title with respect to the concept, the similarity of the section title with respect to the concept, a list of one or more sections to exclude from the snippeting process and/or the like. Each of these one or more features provides the system and method with basic information regarding the relationship of the concept to the section being considered as a snippet. For example, if occurrences of a concept as one or more term annotations occur earlier in a first section than in a second section, then the first section may be considered more relevant as a snippet than the second section. Likewise, if the title of a first section is similar to the concept and a second section does not include a title that is similar to the concept, then the first section may be more relevant as a snippet for the particular concept.

The one or more features may be determined for a particular concept across one or more sections of text arising from the unstructured text corpus received by the system. That is, various sections, paragraphs, chapters, or the like may be segmented in the structured layout of the custom generated document object and terms annotations corresponding to a particular concept may be identified within each. At step 312, the sections, paragraphs, chapters, or the like may be extracted as one of a plurality of snippets for the particular concept. However, at this stage, the plurality of snippets merely includes a recitation of a concept as indicated by a term annotation and the one or more features identified for each of the term annotations. To determine whether one of the plurality of snippets is more relevant than another of the plurality of snippets, they may be scored, filtered, and ranked.

In some embodiments, each of the one or more features determined for a particular concept and particular section may be aggregated to a comprehensive score, at step 314. For each of the plurality of snippets, the related one or more features may be input to generate composite ratios and then a single factor (i.e., a total ratio or comprehensive ratio) in order to rank the top snippets of the plurality of snippets. For example, a composite ratio may be determined through the following example equation.

$$\text{occurrence\_ratio} = (1 + \text{count\_occurence}/\text{MAX}(\text{section\_token\_count}, n)) \qquad \text{Eq. 1}$$

Equation 1 determines an occurrence ratio based on the number of occurrences of a concept in the section divided by the maximum of either the number of tokens within the section or a predetermined value, n. In some embodiments, the predetermined value may be an experimentally determined minimum number of tokens that yield an effective computation of occurrence ratios for concepts. For example, the predetermined value may be, but not limited to, 10, 20, 30, 40, 50, 60, 70, 80, 90, 100, or another value determined to yield computation of occurrence ratios for concepts. According to equation 1, the maximum function will always be at least the predetermined value of n should there not be more than n total tokens within the section. Similarly, a ratio of the first occurrence of a concept may also be determined in equation 2.

$$\text{first\_occurrence\_ratio} = (1 + \text{MIN}((\text{first\_occurrence}-1), n)/100) \qquad \text{Eq. 2}$$

Here, the first occurrence ratio utilizes the relative offset of the first occurrence of the concept within a section to determine a ratio, which may subsequently be utilized to determine an overall ratio for the particular snippet of the plurality of snippets. A total_ratio (also referred to herein as a comprehensive value) may then be determined factoring in the first occurrence of a concept and the number of occurrences of a concept in the section and the size of the section through equation 3.

$$\text{total\_ratio} = \text{first\_occurrence\_ratio} + \text{occurrence\_ratio} \qquad \text{Eq. 3}$$

However, the above method of scoring the plurality of snippets is only one example. Other ratios, values, and equations may be utilized to tailor the scoring method to a particular set of text or domain of literature. For example, without limitation, other equations for scoring may be based upon the occurrence of concepts within various buckets defining portions of a section of the unstructured text corpus and/or the spread of concepts across the buckets defining portions of the sections of the unstructured text corpus.

Although the plurality of snippets may each include a score, which may be compared and used for ranking, there are some additional filtering conditions, which may improve the quality and relevance of the selection of snippets for a particular concept. At step 316, one or more of the snippets of the plurality of snippets may be filtered based on one or more filtering conditions. For example, for a section to be considered a good, quality, and relevant snippet for a particular concept, the concept may preferably appear near the beginning of a section and the amount of text in the section may preferably not be too small or too large. That is, too large of a snippet may not provide value to a user since they may not be able to glean a concise summary of what the snippet may add to their understanding or knowledge of the concept. Similarly, too small of a snippet may not provide any new or additional information to the user and/or too small of a snippet may not indicate a source that contains more information on the concept.

Additionally, a section may be excluded for a particular reason or purpose. That is, some of the filtering conditions may include determining whether a particular snippet corresponds to a section from a section identified as an excluded section. In some embodiments, if a particular snippet corresponds to a section (e.g., a section having the title of "See Also," "Glossary," "Further Reading," "Acknowledgement," or the like), then these snippets may be discarded because it is generally understood that these section do not provide relevant further information on a concept. Specific section titles that are identified as likely not providing relevant further information on a concept may be determined based on heuristics. Such sections may mention a concept but may not provide useful or additional information about a concept because they generally serve a different purpose. As such, a filtration process may select and or filter out the snippets of sections that satisfy one or more of the filtering conditions before the plurality of snippets are ranked.

In some embodiments, it may be preferable that the snippet not be too short or too long. To address this consideration predetermined values for a lower threshold (i.e., a too short length) and an upper threshold (i.e., a too long length) may be determined. The section token count value may then be compared to these predetermined values and if the section token values is less than the lower threshold or greater than the upper threshold, the snippet corresponding to that section token count may be discarded. Furthermore, it may be advantageous that the snippet for a concept occur within the first 10%, 20%, 30%, 40%, 50%, or 60% of the section. To facilitate the determination, the bucket notation discussed above may be utilized. That is, snippets from the plurality of snippets which include a concept having a low_bucket (i.e., an ID of the bucket in which the first occurrence of a concept is seen) is less than or equal to a predetermined cutoff value (e.g., first_bucket_with_concept_occurrence) then the snippet may not be filtered out. It should again be understood that these are only a few of many example of the potential filtering conditions which may be implemented to filter out one or more of the snippets from the plurality of snippets. Moreover, although the step of filtering is described between the scoring and ranking steps herein, filtering may occur before or after each of the scoring and/or ranking steps.

At step 318, the plurality of snippets may be ranked by the computing device into an ordered list of snippets where the top of the list indicates top snippets for the particular concept. In some embodiments, ranking may be determined based on the comprehensive score determined during the scoring step. In some embodiments, ranking may include additional factors driving selection of the top snippets for a concept. As described above, the total score or compressive score may capture the position of the concept with respect to the size of the section. That is, the comprehensive score is not a simple ratio. Rather, the comprehensive score takes into account a nudge factor (e.g., to normalize the ratio for various lengths of the sections and different positions of the concept occurrence). For example, the higher the score, the higher the possibility of that section becoming a top snippet for the concept. In some embodiments, scoring may not include a nudge factor, but when a nudge factor is included to normalize the ratios for the various lengths of sections finer groupings of snippets under different categories and contexts may be achieved.

In some embodiments, ranking may consider or more heavily weight the similarity of a section and/or chapter title with that of the concept. The more similar the titles (including headings and captions) for section divisions at any level are to the individual concept under consideration, the more likely the section containing the concept is very relevant for that concept and thus more likely that it can become one of the top snippets. For example, ranking the plurality of snippets may be based on determining a similarity between a title of a section having a snippet for the concept and the concept such that when a first title of a first section is determined to be similar to the concept, a first snippet within the first section is ranked higher than a second snippet of a second section where a second title of the second section is determined to not be similar to the concept.

In some embodiments, the sections with titles of "Introduction" and "Definition" are given a higher weight in terms of section title similarity even though the concept and the titles are dissimilar. The presumption is that these titles inherently indicate that the section is about the concept when the concept is mentioned within the section to follow the title. As such, any feature expressing similarity of the particular concept under consideration to title content in a cascade of titles leading to a specific text portion may be considered for the ranking process described herein.

The step of ranking may further seek to provide a diversity of reference sources and thereby eliminate multiple snippets from the same source. That is, for content spread and product utility it may be advantageous to select a single top ranked snippet from each reference content source and discard the others. As a result, the selected snippets may be collected from a variety of content sources and at the same time also ensuring that the snippets provide a variety of information about a concept. Similarly, snippets within the plurality of snippets for a concept that are duplicative or near duplicates may be eliminated. That is, one of the two of the duplicates or near duplicates is discarded. A process that applies textual similarity metrics to chapter and/or section titles may determine potential duplicates.

A result of the ranking at step 318 is an ordered list of snippets for a particular concept. The ordered list of snippets defines a top snippet as the first snippet in the list and then a series of further relevant snippets for the topic based on the one or more processes for scoring, filtering, and ranking as described above. At step 320, the ordered list of snippets may then be stored in the data storage component or memory component for later use. The extraction, scoring, filtering, and ranking of a plurality of snippets for a particular concept from the unstructured text corpus, which may contain tens, hundreds, or thousands of reference sources, into ordered lists of snippets for a particular concept, improves the overall search and provisioning of additional and useful information to a user for the particular concept. That is, by identifying snippets from many reference sources and storing them in a digest-like, ordered list, a computing system may provide a customized response to a query of a concept on-demand in a manner requiring less computing power relative to conventional searches that search an entire corpus of documents.

One of the largest challenges facing researchers, authors, professors, students, and the like face is the increased amount of time required to find, read, and determined whether a source provides additional relevant information to the particular concept in which they are interested. The system and methods described herein, generate content summaries having snippets and definitions, which are extracted, pre-sorted, and identified for specific concepts from the unstructured text corpus, offer not only a user more efficient and higher quality responses to the query on a concept but also allows a computing system to dynamically update the ordered list of relevant snippets. For example, as new articles, books, papers, patents, case law, and/or the like are published the system may analyze the content by extracting, scoring, filtering, and ranking snippets from the new sources. These new snippets may be compared and added to preexisting ordered lists of snippets for a particular topic. The continuous or periodic update of snippets and definitions for a concept improves the overall relevance and currentness of the content summaries for a particular concept, which would not otherwise be available.

Furthermore, the ordered lists of snippets for a plurality of concepts may be generated from the unstructured text corpus. For example, a refined and relevant data set including the ordered lists of snippets for the plurality of concepts may be generated, which thereby reduces the storage capacity and computing resources required to formulate a content summary for a particular concept in response to a query of the particular concept. That is, by reducing the material a computing device needs to search, in response to a query of a concept, from the content of the unstructured text corpus to a set of predefined ordered lists of snippets defining relevant information for a plurality of concepts, the computing resources and response time to a query may be reduced and/or the relevancy of the results of the query may be improved.

As an example, a use of the ordered list of snippets may include the computing device receiving a query for a concept, at step 322. The computing device may then search the data storage component or memory component for the ordered list of snippets for the queried concept and return a predefined number of top snippets from the ordered list of snippets as part of a content summary. In some embodiments, a user computing device may receive a query corresponding to a particular concept. The user computing device may then access the ordered lists of snippets stored on the user computing device or another computing device. The user computing device may search the ordered lists of snippets and select a predefined number of snippets corresponding to the queried concept. In some embodiments, the user computing device may receive the query and via a network transmit the query to another computing device for searching the ordered lists of snippets.

In some embodiments, the computing device for generating the content summaries, the user computing device, and/or another computing device may generate a dynamic webpage including a content summary having the predefined number of top snippets from the ordered list of snippets. The predefined number of snippets may be 1, 2, 3, 4, 5, 6, 7, 8, 9, 10, or more snippets from the ordered list of snippets. In some embodiments, the predefined number of top snippets from the ordered list of snippets may be presented on a display, at step 324, wherein the display is a laptop, mobile device or any other computing device.

In some embodiments, the computing device for generating content summaries may provide the plurality ordered lists of snippets to a user computing device such that the user computing device may carry out a query of a particular concept and determine a predefined number of snippets for the particular concept. In some embodiments, providing the user computer with the ordered lists of snippets may include providing the user computing device access to the ordered lists of snippets. In either scenario, by searching the ordered lists of snippets for a set of predefined number of snippets for a particular concept reduces the computing resources and time for responding to a search query since the ordered lists of snippets are pre-structured for relevancy to particular concepts.

In some embodiments, the query may arise from a user selecting a hyperlink within an annotated document where the hyperlink causes the computing device to present a predefined number of snippets to the user within a side or adjacent graphical window to the content the user is browsing. For example, the content summary may allow the user to readily and easily access additional information related to a topic of interest.

Figure 4:
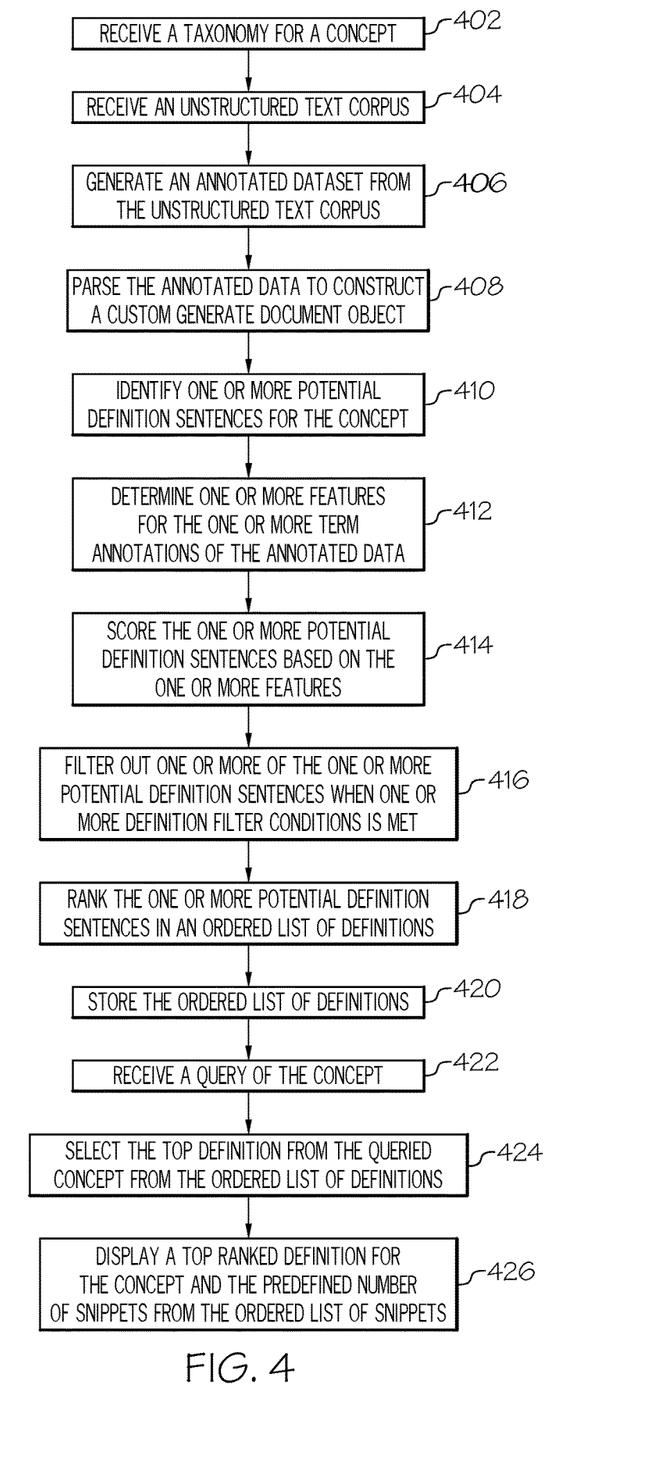
FIG. 4 depicts a flowchart for an example method of extracting a definition for a content summary of a topic, according to one or more embodiments shown and described herein.

In some embodiments, the content summary may include a definition of a concept in addition to or alternatively to a predefined number of snippets. In order to readily provide a definition for a particular concept, a method similar to extracting the plurality of snippets may be implemented to extract one or more potential definitions for the particular concept. Referring to FIG. 4, an example flowchart for extracting definitions for a content summary of a topic, according to one or more embodiments described herein is depicted. Steps 402, 404, 406, and 408 refer to receiving and generating annotated data for an unstructured text corpus, which is similar to receiving and generating annotated data for an unstructured text corpus, as depicted and described with reference to FIG. 3 and steps 302, 304, 306, and 308. As such, for the purposes of brevity, steps 402, 404, 406, and 408 will not be described further herein.

Turning to step 410, the computing device receives the annotated data as a custom generated document object, and identifies one or more potential definition sentences for the concept. In determining one or more definition sentences, the process may focus on the text at a sentence level rather than a section or paragraph level when determining snippets. Since the step of generating an annotated dataset from the unstructured text corpus includes identifying sentences lemmas, words, and POS tags, at steps 306 and 406, an additional parsing or annotation step may not be required.

In some embodiments, identifying one or more potential definition sentences may include passing each of the sentences through a function or validation step to determine whether the sentence is a potential definition sentence or not. For example, the steps to validate a sentence may include the following, in no particular order. First, a determination as to whether a sentence includes a recitation of a concept (whether as a preferred label or alternate label) may be made. If the sentence does not include an annotation of the particular concept, the sentence is considered not to be a potential definition sentence and the sentence is discarded. If the sentence does include an annotation of the particular concept, text, lemmas, and POS tags before and after the concept may be extracted. Second, based on the extracted text, lemmas, and POS tags, a determination may be made as to whether the sentence structure corresponds to one or more predefined patterns. For example, a sentence structure pattern indicating a definition sentence may include the following: {Adjective or Determinants} Concept {verb}. If the sentence structure does not correspond to a predefined pattern, the sentence may be excluded from the one or more potential definition sentences. In some embodiments, the verb patterns: "is a," "is," "is defined as," or the like may indicate that the sentence is a potential definition sentence. Third, a determination may be made as to whether the sentence contains one or more predefined verbs or lemmas, which may indicate poor or bad quality definitions. For example, definitions starting with the words: "this," "these," "that," "most," "many," "within of," "under," "other," "inside," "including," "each," "beyond," "beneath," "another," or the like may indicate poor or bad quality definitions. Similarly, definitions containing the following words anywhere in the text may indicate poor or bad quality definitions: "this," "these," "those," or the like.

In some embodiments, POS tag patterns are also evaluated to determine whether the potential definition sentence may be poor or bad quality. For example, when a POS tag pattern before the concept includes an adjective that is not defined as part of the concept, then the potential definition sentence have a pattern such as (adjective) (concept) may be discarded. Alternatively, POS tag patterns following the concept may also indicate a poor or bad quality definition sentence. For example, POS tag patterns such as: (i) verb adverb adjective, (ii) verb adjective (if it is not followed by a noun), (iii) verb to verb, (iv) verb determinant, (v) verb adjective or adverb preposition, (vi) verb preposition noun, or the like. Furthermore, post concept verb text patterns following the concept may also indicate a poor or bad quality definition. For example, post concept verb text patterns including words such as "also," "then," "thus," "now," "can," "remain," "may," "provides," "will," "was," "were," "not," or the like.

The above patterns may flag the most obvious cases of poor or bad quality definition sentences, but others may be filtered out with definition filtering conditions applied during the filtering step. At step 412, one or more features for each of the one or more potential definition sentences may be determined. The one or more features that are captured for each of the potential definition sentences may include: a sentence ID indicating the ID of the sentence in a paragraph or section, a total count of sentences in the paragraph or section, a normalized weight where the first sentence of a paragraph will have a value of 1 and the last sentence of the paragraph will have a lower value close to 0, a count of the number of characters in a sentence, a title weight indicating the similarity of a section title with that of the concept, a chapter weight indicating the similarity of a chapter title with that of the concept, a verb weight corresponding to a weight assigned based on the verb group that follows the concept in the sentence, a similarity weight indicated as a score comparing how similar the potential definition sentence is to a standard definition, and a filter type score indicating the quality of the definition based on the POS and text based patterns of the potential definition sentence. Referring back to verb weight, certain verb groups may indicate good definitions so that may be assigned a higher weight and the next better group a higher weight than the previous. In such embodiments, verb groups not defined as indicating a good definition may be assigned a weight of 0.

Other features may include a dependency relation quality value indicating the quality of the definition based on the dependency parsing based flagging described in more detail herein, a Boolean indication as to whether the concept is recited in the sentence as a preferred label or not, a Boolean indication as to whether the concept is recited in acronym form or not, and a value indicating whether the concept is a concept extension, that is, whether the concept follows with an acronym, alternate form or additional information in parenthesis. Each of these features and others may be used for scoring, filtering, and ranking the potential definition sentences.

Although the process herein is described with particular reference to extracting definitions from regular books, journal articles and the like, definitions may also be extracted from dictionaries. These books may also be processed through the annotation engine to identify term annotations for concepts. Furthermore, since dictionaries are assumed to include quality definitions, it may not be necessary to apply the above-described identification and validation steps. As such, dictionaries may be used when no good definitions arise during the ranking process of potential definition sentences from a regular book, journal article or the like.

At step 414, the potential definition sentences may be scored by aggregating values from one or more features into a single comprehensive score. For example, a comprehensive score (e.g., total_score_ref_definition) may be determined based on equation 4:

$$\text{total\_score\_ref\_definition} = \text{title\_weight} + \text{section\_weight} + \text{verb\_weight} + \text{sentence\_weight} + \text{similarity\_weight} \qquad \text{Eq. 4}$$

However, in some embodiments, additional features or alternate features may be included in determining the comprehensive score.

Since the initial identification of one or more potential definition sentences may include many options, further filtering may be necessary. At step 416, one or more of the one or more potential definition sentences may be filtered out based on filtering conditions. In some embodiments, filtering is necessary before the ranking process to remove particular instances of potential definition sentences, while in other embodiments, filtering may occur before or after either the scoring or ranking processes. Step 416, filtering, may include applying one or several filtering conditions to the potential definition sentences. For example, some filtering conditions may include determining whether the filter type value from the one or more features indicates a definition sentence or poor or bad quality or not. In some embodiments, filtering may apply a dependency parsing process based on rules that check the dependency relation of the root element (e.g., the marked verbs) with other words in the sentence. For example, if the root and the subject have a passive nominal subject relationship then the sentence may be indicated as a poor or bad quality definition sentence. In some embodiments, the position of the words in a sentence may matter. For example, there are sets of words that make a poor or bad quality definition sentence if they are related to the root word such as, for example, in the phrase "aging are too complex to . . . " Here, the existence of "too" with respect to "complex" indicates a poor quality definition sentence.

In some embodiments, meronymy relationships as determined through dependency parsing may indicate poor or bad quality definitions and are therefore filtered out at step 416. For example, dependency relation may be used to check for the "part of" and "component of" meronymy relationships. By way of example, potential definition sentences including phrases such as "bone is part of" or "cementum is a very important component" may be filtered out. Additionally, in some embodiments, specific relations such as a root and some other token connected using a negative relation may be filtered out as a poor or bad quality definition sentence. Also, if the sentence includes the form of root is "example" or "result" may also indicate a poor or bad quality definition sentence and may be filtered out.

The step of filtering may also include determining whether the length of a potential definition sentence is too long or too short. While a short definition, such as "Malaria is a disease" is in fact a definition, it does not add much valuable information and therefore may be filtered out. For example, by utilizing the feature of sentence length, a sentence having a length less than a predetermined length may be removed from the one or more potential definition sentences. Additionally, in some embodiments, it may be advantageous to remove sentences having a length less than a predetermined percent length of the average length of all definition sentences for a concept within a source domain. For example, if the sentence length is less than 60% of the average length of all definition sentences for a concept, then the sentence may be removed from the one or more potential definition sentences. This may be another method of assuring a proper length for a definition sentence.

It should be understood that the aforementioned techniques and rules are only a few of those that may be utilized to determine poor or bad quality or good quality definition sentences for a concept. In general, the filtering conditions may be used to identify false positive definitions. At step 416, the false positive definitions may be filtered out of the one or more potential definition sentences prior to ranking the one or more potential definition sentences.

At step 418, the potential definition sentences are ranked into an ordered list of definitions for a particular concept. Ranking the one or more potential definition sentences may be based on the comprehensive score determined from the one or more features during the scoring step. In some embodiments, the step of ranking may include additional weighting and filtering measures to refine the ordered list of definitions. For example, the step of ranking may assign a higher weight (i.e., higher rank or priority) to the potential definition sentences, which include the preferred label of the concept as opposed to an alternate label. Similarly, non-acronym recitations of a concept in the potential definition sentences may be ranked higher that those that include the concept, but in acronym form. That is, because it may be assumed that the use of an acronym may not be first or a primary reference to the concept within a section, paragraph, chapter, or the like.

Although the filter type value, which was discussed above, was utilized to identify and remove poor and bad quality definition sentences, the filter type value may also indicate definition sentences with good or preferred sentence structures. As such, those definition sentences indicated as having a good or preferred sentence structure for a definition may be assigned a higher rank than those that do not have an indication of a good or preferred sentence structure.

Furthermore, the ranking process may assign concepts, which are immediately followed by, for example, metadata in parenthesis a higher priority than those that do not include metadata in parenthesis. In some embodiments, the type of verb used in the definition sentence may indicate a stronger definition than other definition sentences having alternate verbs. As such, the ranking process may assign definition sentences utilizing specific verbs or verb patterns such as "is a," "is defined as" or the like as with a higher rank than those that do not include the specific verbs or verb patterns.

It should be understood that the ranking process of step 418 may include additional or alternate ranking parameters. However, the result of the ranking process is the formulation of an order list of definitions for a concept. At step 420, the ordered list of definitions may be stored in the data storage component or memory component for later use. In some embodiments, a single concept may have multiple definitions based on the context in which the concept appears. Therefore, by providing a definition for a concept, a user may readily determine whether the following information, for example, the plurality of snippets, pertains to the particular definition of the concept for which they are seeking additional information. As described above, the ordered list of definitions may be extracted, scored, filtered, and ranked from the unstructured text corpus. The compilation and storing of an ordered list of definitions for a concept from the unstructured text corpus, which may contain tens, hundreds, or thousands of primary reference sources, may enhance the efficiency and speed at which a computing device may respond to a query of a concept. That is, instead of searching the content of many sources, computing resources may be focused on searching the plurality ordered lists of definitions and returning the definition related to the queried concept. As a result, the functionality of the computing device is improved.

For example, the computing device may receive a query for a concept, at step 422. The computing device may then search the data storage component or memory component for the ordered list of definitions for the queried concept and select the top definition, at step 424. Additionally, a predefined number of top snippets from the ordered list of snippets for the particular concept may be selected to generate a content summary for the queried concept.

In some embodiments, the computing device for generating content summaries may provide the plurality ordered lists of definitions to a user computing device such that the user computing device may carry out a query of a particular concept and determine a definition for the particular concept from the plurality ordered lists of definitions. In some embodiments, providing the user computer with the ordered lists of definitions may include providing the user computing device access to the plurality ordered lists of definitions. In any scenario, by searching the plurality ordered lists of definitions for a definition for a particular concept reduces the computing resources and time for responding to a search query since the plurality of ordered lists of definitions are pre-structured for relevancy to particular concepts.

In some embodiments, the computing device may generate a dynamic webpage including a content summary having the top definition for the queried concept and/or the predefined list of snippets selected from the ordered list of snippers based on the queried concept. At step 426, the dynamic webpage or other type of generated interface such as side pane within an electronic document may be presented on a display. The display may be a display of a laptop, mobile device, or any other computing device. As discussed in more detail below, the dynamically generated webpage or other interface may provide a user with unique content from primary reference sources for a queried concept of interest.

Figure 5:
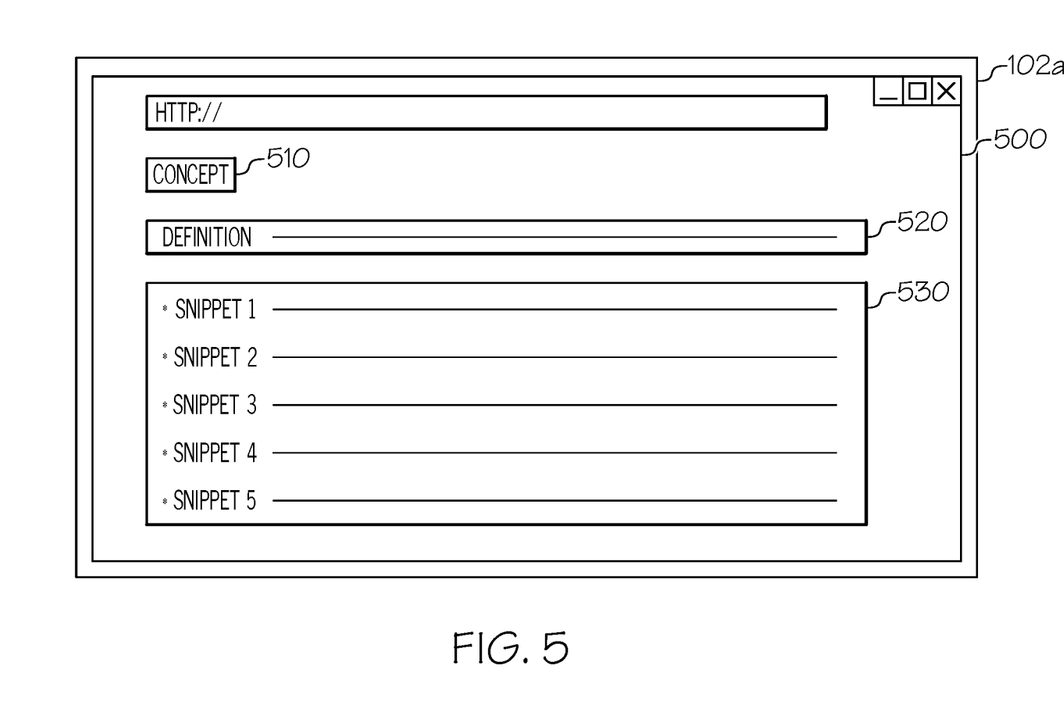
FIG. 5 schematically depicts a dynamically generated webpage for a content summary of a topic, according to one or more embodiments shown and described herein.

Referring to FIG. 5, a dynamically generated webpage for a content summary of a topic, according to one or more embodiments described herein is depicted. While the layout and content of the dynamically generated webpage may vary, FIG. 5 provides one example. A display 102a may present a webpage window 500. For example, the dynamically generated webpage may be a separate URL, which may be opened within the current browsing window, a new tab, or a new window. The webpage window 500 may be formatted to display the concept 510, a definition 520 for the concept 510 and a predetermined number of snippets 530. The definition 520 may include a link to the source document so that the user may navigate to the source document for further information or retrieve citation information. The predetermined number of snippets 530 may be presented in a ranked order with the most relevant at the top and next relevant below. The predetermined number of snippets 530 may also include a link to the source document so that the user may navigate to the source document for further information. In some embodiments, citation information may be provided with the definition and each of the predetermined number of snippets allowing a user to readily cite information obtained from their query of a particular concept.

Content summaries, for example, those presented within a dynamically generated webpage, offer a user direct access to relevant information for a particular concept from primary resources in the form of snippets of information and/or citations to the snippets within the full text of the references sources. Presently, certain internet-based searchable content engines and interfaces rely on a mixture of sources to develop original content in the form of articles and do not provide access to the particular sections of a primary reference source, which contains the additional relevant information for a concept. Instead, content summaries provide content in the form of snippets and definitions extracted from primary references. For users, such as researchers, authors, professors, attorneys, student, and the like, the reliance on primary references is preferred when conducting research and/or preparing original publications. As such, content summaries, which present information directly from primary references rather than secondary articles based on primary references, may be more advantageous when seeking additional information or background research on a particular concept.

In addition to optimizing the storage requirements and computing resources required to identify snippets and definitions related to a particular concept, presenting the content in a layered content format within dynamically generated webpages (e.g., utilizing masonry brick layouts) having the relevant and succinct content for concepts increases the ranking of the webpages within search engine results. Many search engines determine the ranking of webpages based on the speed of accessibility to a webpage and the quality of the content. Embodiments described herein generate readily accessible individual webpages with relevant and succinct content for particular concepts that are optimized for search engines. Generally, search engines score the content within a webpage or text source to determine its ranking. That is, an article or book may contain discussions about a number of concepts and as a whole may not be considered a high quality search result for a particular concept query run by a search engine. However, when relevant portions are extracted from the larger content and presented in a succinct format, their relevancy to a typical search engine increases. In other words, a webpage, article, book, publication or the like, which contains relevant content for a particular concepts may not be identified because the formatting of the content or the information regarding the concept within the webpage, article, book, publication or the like is not presented in a manner in which a typical search engine would consider them relevant. By extracting relevant snippets and definitions from text corpuses of references and generating, for example, dynamically generated webpages for a particular concept having the relevant snippets and definitions, the ranking of the webpage by a search engine increases. Furthermore, the succinct content for a concept from a variety of sources improves the search engines ability to identify relevant sources of information based on a search query. Therefore, the quality of a search engine results are improved.

It should be understood that the systems and methods shown and described herein may be utilized to generate content summaries for one or more topics or concepts. The system and method receive an unstructured text corpus of science, history, legal or other domains of literature. The unstructured text corpus may be annotated, thereby identifying term annotations and metadata for one or more concepts. The annotated data may be parsed to generate a structured document for further extraction, scoring, filtering, and ranking of a particular concept. It should also be understood that while reference herein to the systems and methods is directed to determining definitions and snippets for a particular concept, many concepts may be extracted from the unstructured text corpus with each having corresponding definitions and snippets for an automatically generated content summary of the concept.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of automatically generating content summaries for topics, the method comprising:
   receiving, at a computing device, a taxonomy for a concept;
   receiving, at the computing device, an unstructured text corpus;
   generating an annotated dataset from the unstructured text corpus based on the taxonomy, wherein the annotated dataset includes one or more term annotations corresponding to the concept, the one or more term annotations providing a start and end offset of the concept in the unstructured text corpus;
   parsing the annotated dataset into a custom generated document object having a structured layout;
   determining one or more features for each of the one or more term annotations;
   extracting a plurality of snippets for the concept from the custom generated document object, wherein each of the plurality of snippets corresponds to a section of the custom generated document object;
   scoring each of the plurality of snippets based on the one or more features such that each of the plurality of snippets for the concept corresponds to a comprehensive score calculated from a summation of ratios determined from a value associated with each of the one or more features, wherein the one or more features include at least one of the following: a relative offset of a first occurrence of the concept in the section, a relative offset of a last occurrence of the concept in the section, a total number of occurrences of the concept in the section, a count of tokens in the section, or a similarity rank between the concept and a title of the section, and wherein at least one of the ratios comprises an occurrence ratio determined from the total number of occurrences of the concept in the section divided by the count of tokens in the section, wherein the calculated comprehensive score further comprises a nudge factor corresponding to a position of the concept in the section with respect to a size of the section;
   filtering out one or more snippets from the plurality of snippets when one or more snippet filtering conditions is met;
   ranking the plurality of snippets into an ordered list of snippets for the concept based on the comprehensive score, wherein a first snippet in the ordered list of snippets is a top ranked snippet and is more relevant to the concept than a second snippet in the ordered list of snippets; and
   providing, to a user computing device, the ordered list of snippets.

2. The method of claim 1, further comprising storing the ordered list of snippets for the concept in a data storage component.

3. The method of claim 1, further comprising:
   receiving, from the user computing device, a query of the concept; and
   displaying a predefined number of snippets for the concept from the ordered list of snippets.

4. The method of claim 3, wherein the predefined number of snippets for the concept are displayed within a dynamically generated webpage.

5. The method of claim 1, wherein the unstructured text corpus includes text from one or more reference sources and the method further comprises:
   selecting the top ranked snippet from the ordered list of snippets for the concept from each of the one or more reference sources; and
   discarding all other snippets in the ordered list of snippets for the concept from each of the one or more reference sources.

6. The method of claim 1, wherein ranking the plurality of snippets is further based on determining a similarity between the title of the section having a snippet for the concept and the concept such that when a first title of a first section is determined to be similar to the concept, a first snippet within the first section is ranked higher than a second snippet of a second section where a second title of the second section is determined to not be similar to the concept.

7. The method of claim 1, wherein the unstructured text corpus comprises one or more sections, paragraphs, or chapters of at least one of the following: a journal article, a document, or a book.

8. The method of claim 1, wherein the concept defined within the taxonomy includes a preferred label and at least one alternate label, wherein the preferred label and the at least one alternate label correspond to a unique common concept ID within the taxonomy.

9. The method of claim 1, wherein the one or more snippet filtering conditions includes at least one of the following: the count of tokens within the section below a lower threshold, the count of tokens within the section greater than an upper threshold, or the section is identified as an excluded section.

10. A method of automatically generating content summaries for topics, the method comprising:
  receiving, at a computing device, a taxonomy for a concept;
  receiving, at the computing device, an unstructured text corpus;
  generating an annotated dataset from the unstructured text corpus based on the taxonomy, wherein the annotated dataset includes one or more term annotations corresponding to the concept, the one or more term annotations providing a start and end offset of the concept in the unstructured text corpus;
  parsing the annotated dataset into a custom generated document object having a structured layout, wherein the custom generated document object defines one or more sentences within the annotated dataset;
  identifying one or more potential definition sentences for the concept;
  determining one or more features for each of the one or more potential definition sentences;
  scoring the one or more potential definition sentences based on the one or more features such that each of the one or more potential definition sentences includes a comprehensive score, wherein the one or more features comprise: a title weight, a verb weight, a sentence weight, and a similarity weight, wherein:
    the title weight is associated with a similarity of a title of a section including one of the one or more potential definition sentences to the concept,
    the verb weight is associated with a presence of a verb associated with the concept, wherein the verb is included in a verb group that indicate a definition, wherein the verb weight of the verb from the verb group is assigned a higher weight than a verb not from the verb group,
    the sentence weight is associated with a position of the one or more potential definition sentences within a paragraph of the section,
    the similarity weight is associated with a similarity score defined by comparing one of the one or more potential definition sentences to a standard definition of the concept,
    the comprehensive score is determined based on a summation of weights of the one or more features for each of the one or more potential definition sentences, and
    the comprehensive score further comprises a nudge factor corresponding to a position of the concept in the section with respect to a size of the section;
  filtering out one or more of the one or more potential definition sentences when one or more definition filter conditions is met;
  ranking the one or more potential definition sentences into an ordered list of definitions for the concept based on the comprehensive score, wherein a first definition in the ordered list of definitions is more relevant to the concept than a second definition in the ordered list of definitions; and
  providing, to a user computing device, the ordered list of definitions.

11. The method of claim 10, further comprising storing, using the computing device, the ordered list of definitions for the concept in a data storage component.

12. The method of claim 10, further comprising:
  receiving, with the computing device, a query of the concept;
  receiving, with the computing device, a predefined number of snippets for the queried concept;
  selecting a top ranked definition from the one or more potential definition sentences for the queried concept; and
  displaying the top ranked definition and the predefined number of snippets and for the concept.

13. The method of claim 12, wherein the top ranked definition and the predefined number of snippets and for the concept are displayed within a dynamically generated webpage.

14. The method of claim 10, wherein identifying the one or more potential definition sentences further includes:
  selecting a sentence within the one or more sentences;
  determining that the sentence includes the concept;
  in response to determining that the concept exists within the sentence, determining whether the sentence has a predefined sentence structure pattern; and
  in response to determining that the sentence includes the predefined sentence structure pattern, determining whether the sentence includes at least one of a predefined set of verbs indicating a poor quality definition sentence such that when the sentence includes the at least one of the predefined set of verbs the sentence is excluded from the one or more potential definition sentences for the concept.

15. The method of claim 10, wherein the concept in the taxonomy includes a preferred label and at least one alternate label, wherein the preferred label and the at least one alternate label correspond to a unique common concept ID within the taxonomy.

16. The method of claim 10, wherein ranking the one or more potential definition sentences into the ordered list of definitions includes ranking a first potential definition sentence of the one or more potential definition sentences that recites the concept using a preferred label higher than a second potential definition sentence of the one or more potential definition sentences that recites the concept using an alternative label.

17. The method of claim 10, wherein ranking the one or more potential definition sentences into the ordered list of definitions includes ranking a first potential definition sentence of the one or more potential definition sentences that recites the concept in a non-acronym form higher than a second potential definition sentence of the one or more potential definition sentences that recites the concept in acronym form.

18. A system for automatically generating content summaries for topics comprising:
  a processor; and
  a non-transitory, processor-readable memory coupled to the processor, the non-transitory, processor-readable memory comprising a machine readable instruction set stored thereon that, when executed by the processor, causes the processor to:
    receive a taxonomy for a concept;
    receive an unstructured text corpus, wherein the unstructured text corpus includes text from one or more reference sources;
    generate an annotated dataset from the unstructured text corpus based on the taxonomy, wherein the annotated dataset includes one or more term annotations corresponding to the concept, the one or more term annotations providing a start and end offset of the concept in the unstructured text corpus;
    parse the annotated dataset into a custom generated document object having a structured layout;

determine one or more features for each of the one or more term annotations;

extract from the custom generated document object, a plurality of snippets for the concept, wherein each of the plurality of snippets corresponds to a section of the custom generated document object;

score each of the plurality of snippets based on the one or more features such that each of the plurality of snippets for the concept corresponds to a comprehensive score calculated as a summation of ratios determined from a value associated with each of the one or more features, wherein the one or more features include at least one of the following: a relative offset of a first occurrence of the concept in the section, a relative offset of a last occurrence of the concept in the section, a total number of occurrences of the concept in the section, a count of tokens in the section, or a similarity rank between the concept and a title of the section, and wherein at least one of the ratios comprises an occurrence ratio determined from the total number of occurrences of the concept in the section divided by the count of tokens in the section, wherein the calculated comprehensive score further comprises a nudge factor corresponding to a position of the concept in the section with respect to a size of the section;

filter out one or more snippets from the plurality of snippets when one or more snippet filtering conditions is met;

rank the plurality of snippets into an ordered list of snippets for the concept based on the comprehensive score, wherein the first snippet in the ordered list of snippets is a top ranked snippet and is more relevant to the concept than a second snippet in the ordered list of snippets; and store the ordered list of snippets for the concept.

19. The system of claim 18, further comprising a display communicatively coupled to the processor, wherein the machine readable instruction set, when executed, further causes the processor to:

receive a query of the concept; and cause the display to present a predefined number of snippets for the concept from the ordered list of snippets.

20. The system of claim 19, wherein the predefined number of snippets for the concept are displayed within a dynamically generated webpage.

* * * * *